United States Patent

Stafiej et al.

[11] Patent Number: 5,939,042
[45] Date of Patent: Aug. 17, 1999

[54] TELLURIUM EXTRACTION FROM COPPER ELECTROREFINING SLIMES

[75] Inventors: Jack S. Stafiej, Dorval; Pierre Claessens, St-Eustache; Carl W. White, Notre-Dame-de-Grâce, all of Canada

[73] Assignee: Noranda, Inc., Canada

[21] Appl. No.: 09/122,379

[22] Filed: Jul. 27, 1998

[51] Int. Cl.⁶ .................................................. C01B 19/00
[52] U.S. Cl. .......................... 423/508; 423/509; 423/510
[58] Field of Search ..................................... 423/508, 509, 423/510

[56] References Cited

U.S. PATENT DOCUMENTS

| | | | |
|---|---|---|---|
| 509,634 | 11/1893 | Tuttle et al. | |
| 1,757,592 | 5/1930 | Schleicher | |
| 2,076,738 | 4/1937 | Martin et al. | 75/99 |
| 2,981,595 | 4/1961 | Tuwiner | 23/50 |
| 3,091,516 | 5/1963 | Conn | 23/209 |
| 3,127,244 | 3/1964 | Elkin et al. | 23/209 |
| 4,002,544 | 1/1977 | Heimala et al. | 204/109 |
| 4,047,939 | 9/1977 | Morrison | 75/99 |
| 4,224,301 | 9/1980 | Washall | 423/508 |
| 4,244,936 | 1/1981 | Victor et al. | 423/509 |
| 4,256,912 | 3/1981 | Wolsky et al. | 560/248 |
| 4,288,423 | 9/1981 | Rasmussen | 423/510 |
| 4,293,332 | 10/1981 | Wang et al. | 75/99 |
| 4,299,810 | 11/1981 | Snow | 423/510 |
| 4,374,758 | 2/1983 | Sasaki et al. | 252/439 |
| 5,160,588 | 11/1992 | Sugawara et al. | 204/109 |
| 5,271,909 | 12/1993 | Claessens et al. | 423/34 |

FOREIGN PATENT DOCUMENTS 2049276  2/1993  Canada.

OTHER PUBLICATIONS

"Leaching Of Cu Refinery Slimes", T. De Decker, A. Backx, and A. Van Petegh, 1976, no month.

*Primary Examiner*—Steven Bos
*Attorney, Agent, or Firm*—Fitzpatrick, Cella, Harper & Scinto

[57] ABSTRACT

The present invention is concerned with a method for the substantially selective extraction of tellurium from copper electrorefining slimes. The method comprises maintaining a molar ratio Ag/Se, Ag/S or Ag/Se+S at a value of about 2 or less in the slimes during leaching thereof in an autoclave. The excess of selenium and/or sulphur allows the formation of $Ag_2Se$ or $Ag_2S$, which remains insoluble during autoclave leaching.

6 Claims, No Drawings

TELLURIUM EXTRACTION FROM COPPER ELECTROREFINING SLIMES

FIELD OF THE INVENTION

The present invention relates to a method for extracting tellurium from tellurium-containing materials, and more particularly copper electrorefining slime.

BACKGROUND OF THE INVENTION

In conventional electrorefining of copper, a copper anode made of about 99.8% copper is placed in an electrolyte, typically copper sulphate/sulphuric acid. By the action of current applied to the anode, the copper dissolves and is deposited at a cathode to a purity level of at least 99.99%. Such electrorefining produces slimes that precipitate at the bottom of the electrorefining cell, and can be removed from the electrolyte through conventional liquid/solid separation. The slimes contain precious metals, like gold, silver, platinum, etc. originally in the anode, as well as small residues of copper. In addition, they contain undesirable impurities such as arsenic, tellurium, selenium, bismuth etc.

Because of the high value of their content, electrorefiners treat the slimes to recover the precious metals. Several treatment methods have been proposed for recovering the various metals and non-metals from the slimes.

Copper and lead electrorefining slimes are a major source of tellurium. Tellurium is a nuisance element that must be removed to recover precious metals from copper slimes. For the overall slime treatment process efficiency, it is important to extract as much tellurium as possible. Such extraction is typically carried out in autoclaves. Any tellurium not removed in the autoclave goes to the top blown reverbatory converter (TBRC) where it is captured in the slag. This slag is recycled, as flotation tailings, to the smelter creating additional, unwanted, tellurium input to the smelter.

Several methods have been proposed to recover tellurium from electrorefining slimes. For example, in U.S. Pat No. 2,076,738, there is disclosed a method comprising fluxing the slimes with soda ash or caustic soda to produce a slag that is subsequently cooled and leached with hot water to extract sodium tellurite.

U.S. Pat No. 2,981,595 teaches a process for recovering tellurium from anode slimes produced during copper electrorefining. The process comprises digesting the slimes in sulphuric acid to form soluble tellurium sulphate, and the solid fraction is removed by filtration. Metallic copper is then added to the filtrate to form a copper-tellurium cementation product containing finely divided tellurium particles. Some metallic silver is also precipitated with the tellurium. Metallic tellurium is then recovered from the cementation product through a smelting operation.

U.S. Pat. No. 3,127,244 discloses a process for separately recovering selenium and tellurium having an oxidation state of from +2 to −2 from copper electrorefining slimes. The process uses pressure leach in an autoclave in the presence of an excess of alkali metal hydroxide, and oxygen.

U.S. Pat. No. 4,047,939 is concerned with a process for the leaching of copper electrorefining slimes with dilute sulphuric acid under oxygen partial pressure at a temperature between 80 and 160° C. to dissolve substantially all copper and tellurium.

After a liquid-solid separation, the tellurium in the filtrate is cemented with metallic copper as copper telluride.

In a presentation made by Decker et al. at the AIME in Las Vegas in 1976, it is observed that if the molar ratio of Ag/Se+Te in the slimes is greater than 2.8, then silver leaches first. On the other hand, if the Ag/Se+Te molar ratio is smaller than 2.8, tellurium leaches first. The paper suggests that the anode furnace charges should be conditioned so that the ratio silver/selenium+tellurium in the anodes is higher than 2.8, the goal in this paper being to leach the silver first whenever possible. However, the suggested conditioning of the charges in the anode furnace is not always practical or possible because it would require tight control of the feed material. Further, the composition of the feed materials may not allow for the proper ratio to be obtained.

U.S. Pat. No. 4,299,810 describes a process for separating selenium and tellurium from copper slimes. Initially, the slimes are leached with concentrated sulphuric acid to dissolve selenium and tellurium. Leaching is further pursued at high temperature to precipitate the dissolved tellurium. After a solid-liquid separation, the solid is leached with water to solubilize the tellurium.

U.S. Pat. No. 5,160,588 teaches a process for removing tellurium from copper slimes, wherein a copper electrode plate is suspended in a bath containing a solution of copper and tellurium sulphate, for precipitating copper telluride thereon.

U.S. Pat. No. 5,271,909 is concerned with an improved method for extracting tellurium from copper slimes. The method comprises leaching the slimes in an autoclave at a temperature of from 100 to 200° C. to dissolve copper, tellurium and nickel, halting the leaching process and adding a reducing agent to reprecipitate excess of silver and/or selenium dissolved in the solution. Although the high temperature and oxygen pressure allows a higher extraction yield of tellurium, it has the major disadvantage of causing excessive leaching of silver and selenium, and an additional reduction step is therefore required to precipitate the latter two elements.

As it can be seen from the above, although several methods are proposed, none of them provide for a substantially selective extraction of tellurium in the copper electrorefining slimes without a secondary treatment to remove interfering elements.

Although the copper smelting process used for producing copper anodes is substantially similar throughout the world, it is common knowledge that copper anode compositions vary because the composition of the copper concentrate used as the starting material in the anode furnace is also variable. The slimes produced from copper electrorefining will therefore also have various compositions.

It would therefore be highly desirable to develop a method for the substantially selective extraction of tellurium from tellurium-containing materials such as copper electrorefining slimes. Such method should be versatile enough so that it could be easily implemented, no matter what the chemical composition of the slimes is.

SUMMARY OF THE INVENTION

In accordance with the present invention, there is now provided a method for the substantially selective extraction of tellurium from tellurium-containing materials such as copper electrorefining slimes. More specifically, the method comprises the steps of:

mixing the tellurium-containing materials with an acidic solution to obtain a slurry;

adding to the slurry selenium, a selenium-containing compound, sulphur or mixtures thereof in an amount such that molar ratio silver/selenium, silver/sulphur or silver/selenium+sulphur is substantially 2 or lower; and leaching the slurry in a vessel under oxygen partial pressure to substantially selectively solubilize the tellurium; and carrying a solid/liquid separation to recover the dissolved tellurium.

DETAILED DESCRIPTION OF THE INVENTION

The present invention is directed to the substantially selective extraction of tellurium from tellurium-containing materials, and more particularly copper electrorefining slimes. Conventionally, a slurry of the shines is prepared in diluted sulphuric acid, and leached in an autoclave to extract certain metal values, including silver and tellurium. However, the concentrations of the various elements present in the slimes vary greatly, and therefore, leaching conditions must frequently be adjusted. As a result, it is difficult to selectively leach tellurium from the slimes. It has been found that the ratio silver/selenium or silver/sulphur or silver/sulphur+selenium is the most important factor influencing the tellurium extraction by conventional autoclave leaching. To ensure that tellurium is substantially selectively leached without silver extraction, selenium, a selenium-containing compound, sulphur or mixtures thereof is added in the slurry in a concentration such that the ratio silver/selenium, silver/sulphur or silver/selenium+sulphur is about 2 or less. It has been found that selenium and sulphur "fix" silver as $Ag_2Se$ or $Ag_2S$, thus preventing dissolution of silver, and favoring the substantially selective and enhanced leaching of tellurium from the slurry.

The selenium is preferably added in its elemental form, but may also be added in a soluble form, such as $H_2SeO_3$ or $Na_2SeO_3$. If the selenium is added as a soluble selenium-containing compound, elemental copper should preferably be present in the slurry to cement the selenium. Sulphur is preferably added in its elemental form. Diluted sulphuric acid, i.e., with a concentration around 250 g/L, and an oxygen partial pressure of about 10 psi or more are preferred conditions for the autoclave leaching. The duration of the tellurium extraction step in the autoclave typically varies from 1 to 4 hours, to maximize tellurium dissolution.

Higher temperatures generally favor tellurium dissolution during the autoclave leaching. However, this parameter must be carefully controlled, because higher temperatures may also cause the dissolution of some silver, and therefore an undesirable post-autoclave reduction treatment to remove dissolved silver will be required.

The present invention will now be illustrated by the following examples, which are provided to show preferred embodiments of the invention, and should not be construed as limiting its scope.

EXAMPLES

A slurry of copper electrorefining slimes is prepared by mixing the slimes with diluted sulphuric acid (about 250 g/L). The solid content of the slurry is adjusted to about 20%. The slurry is then placed in an autoclave and elemental selenium is added to obtain various silver/selenium ratios. Leaching is carried out in the autoclave for 3 hours under an oxygen partial pressure of 18 psi and a temperature of 132° C. Table 1 illustrates results obtained with various Ag/Se ratios with and without addition of selenium. Table 2 illustrates results obtained with various Ag/S+Se ratios with and without addition of The ratio referred to includes selenium since this element is already present in the slimes treated.

TABLE 1

| Test No. | Ag/Se | Selenium Added | Adjusted Ag/Se | % Te leached | % Ag leached |
|---|---|---|---|---|---|
| 1 | 2.80 | No | — | 36.3 | 6.3 |
| 2 | 2.80 | Yes | 1.86 | 90.4 | <0.01 |
| 3 | 3.01 | No | — | 37.3 | 7.1 |
| 4 | 3.01 | Yes | 1.83 | 71.8 | <0.01 |
| 5 | 3.41 | No | — | 19.9 | 15.1 |
| 6 | 3.41 | Yes | 1.86 | 92.5 | <0.007 |
| 7 | 3.36 | No | — | 27.1 | 12.6 |
| 8 | 3.36 | Yes | 1.85 | 90.7 | <0.007 |
| 9 | 2.59 | No | — | 55.5 | 6.7 |
| 10 | 2.59 | Yes | 1.85 | 91.5 | 0.1 |

TABLE 2

| Test No. | Ag/Se | Sulphur Added | Adjusted Ag/(Se + S) | % Te leached | % Ag leached |
|---|---|---|---|---|---|
| 11 | 3.41 | No | — | 19.9 | 15.1 |
| 12 | 3.41 | Yes | 1.55 | 93.4 | <0.004 |
| 13 | 2.70 | No | — | 34.1 | 7.9 |
| 14 | 2.70 | Yes | 1.55 | 90.7 | <0.005 |
| 15 | 2.20 | No | — | 67.1 | 2.8 |
| 16 | 2.20 | Yes | 1.55 | 84.9 | <0.007 |

One important aspect of the method of the present invention is that it can be applied to any copper electrorefining slimes, no matter what the composition is.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A method for extracting tellurium from a material containing tellurium and silver, the method comprising the steps of:

mixing the tellurium and silver-containing material with an acidic solution to obtain a slurry;

after said mixing, adding to said slurry selenium, a selenium-containing compound, elemental sulphur, or mixtures thereof in an amount such that the molar ratio silver/selenium, silver/sulphur or silver/selenium+ sulphur is 2 or lower;

leaching the slurry in a vessel under oxygen partial pressure to selectively solubilize the tellurium while retaining the silver in a solid phase of the slurry; and carrying out a solid/liquid separation to recover the dissolved tellurium.

2. A method according to claim 1 wherein the tellurium-containing material comprises copper electrorefining slimes.

3. A method according to claim 1 wherein the selenium is in the form of elemental selenium, $H_2SeO_3$ or $Na_2SeO_3$.

4. A method according to claim 1 wherein the vessel comprises an autoclave.

5. A method according to claim 1 wherein the acidic solution comprises a sulphuric acid solution.

6. A method for extracting tellurium from copper electrorefining slimes containing tellurium and silver, the method comprising the steps of:

mixing the slimes with diluted sulfuric acid to obtain a slurry;

after said mixing, adding to said slurry selenium, a selenium-containing compound, elemental sulphur, or mixtures thereof in an amount such that the molar ratio silver/selenium, silver/sulphur or silver/selenium+ sulphur is 2 or lower;

leaching the slurry in an autoclave under oxygen partial pressure to solubilize the tellurium without solubilizing the silver; and carrying out a solid/liquid separation to recover the dissolved tellurium.

* * * * *